United States Patent
Curlic et al.

(10) Patent No.: US 10,415,435 B2
(45) Date of Patent: Sep. 17, 2019

(54) METHOD FOR INSTALLING A CAMSHAFT MODULE

(71) Applicant: ThyssenKrupp Presta TecCenter AG, Eschen (LI)

(72) Inventors: Marko Curlic, Schaanwald (LI); Aaron Pfitscher, Ludesch (AT); Manfred Muster, Ludesch (AT)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 194 days.

(21) Appl. No.: 15/524,314

(22) PCT Filed: Aug. 3, 2015

(86) PCT No.: PCT/EP2015/067846
§ 371 (c)(1),
(2) Date: May 4, 2017

(87) PCT Pub. No.: WO2016/071016
PCT Pub. Date: May 12, 2016

(65) Prior Publication Data
US 2017/0314424 A1   Nov. 2, 2017

(30) Foreign Application Priority Data

Nov. 6, 2014   (DE) .................. 10 2014 116 207

(51) Int. Cl.
*F01L 1/047*   (2006.01)
*F01L 13/00*   (2006.01)

(52) U.S. Cl.
CPC ........... *F01L 1/047* (2013.01); *F01L 13/0036* (2013.01); *F01L 2001/0473* (2013.01);
(Continued)

(58) Field of Classification Search
CPC ... F01L 1/047; F01L 13/0036; F01L 2103/02; F01L 2103/01; F01L 2103/00; F01L 2001/0473; F01L 2013/0052
See application file for complete search history.

(56) References Cited

U.S. PATENT DOCUMENTS 5,195,239 A * 3/1993 Breuer ................. B21D 26/14
                                                                29/468
5,280,672 A * 1/1994 Hochstein ............. B21D 26/08
                                                                29/888.1
(Continued)

FOREIGN PATENT DOCUMENTS

CN      1756896 A    4/2006
DE     19831772 A    1/1999
(Continued)

OTHER PUBLICATIONS

English translation of International Search Report issued in PCT/EP2015/067846 dated Oct. 22, 2015 (dated Oct. 30, 2015).
(Continued)

*Primary Examiner* — Jun S Yoo
(74) *Attorney, Agent, or Firm* — thyssenkrupp North America, Inc.

(57) ABSTRACT

A method for mounting a camshaft module may involve a module that includes a module cover in which a camshaft is accommodated. The camshaft may comprise a main shaft and a plurality of displacement elements with cam tracks formed thereon for valve-control purposes. The displacement elements may be arranged at predetermined positions in the module cover. The main shaft may be guided along a shaft axis through accommodating passages of the displacement elements. The method may involve arranging a first displacement element in the module cover, introducing the main shaft into the module cover and guiding the main shaft through the accommodating passage of the first displace-
(Continued)

ment element, arranging a second displacement element in the module cover, rotating the main shaft about the shaft axis by an angular amount, and advancing and guiding the main shaft through the accommodating passage of the second displacement element. Further, the displacement elements are arranged in the model cover with an identical rotary orientation about the shaft axis.

20 Claims, 5 Drawing Sheets

(52) U.S. Cl.
CPC ... *F01L 2013/0052* (2013.01); *F01L 2103/00* (2013.01); *F01L 2103/01* (2013.01); *F01L 2103/02* (2013.01)

(56) References Cited

U.S. PATENT DOCUMENTS

| | | | | |
|---|---|---|---|---|
| 2004/0111883 | A1* | 6/2004 | Merz | B23K 11/11 29/888.1 |
| 2006/0064872 | A1* | 3/2006 | Shirai | B21D 53/84 29/888.1 |
| 2013/0125699 | A1* | 5/2013 | Bechtold | B23P 11/00 74/567 |

FOREIGN PATENT DOCUMENTS

| | | |
|---|---|---|
| DE | 102004011586 A | 10/2004 |
| DE | 102005020236 A | 11/2006 |
| DE | 102009057633 B | 3/2011 |
| DE | 102009051636 A | 5/2011 |
| DE | 102011011803 A | 8/2012 |
| DE | 102011001661 A | 10/2012 |
| DE | 102011117849 A | 5/2013 |
| DE | 102013107284 A | 4/2014 |
| DE | 102013211702 A | 12/2014 |

OTHER PUBLICATIONS

English abstract of DE102013211702.
English abstract of DE102011011803.
English abstract of DE102013107284.
English abstract of DE102004011586.

\* cited by examiner

Fig. 2

METHOD FOR INSTALLING A CAMSHAFT MODULE

CROSS REFERENCE TO RELATED APPLICATIONS

This application is a U.S. National Stage Entry of International Patent Application Serial Number PCT/EP2015/067846, filed Aug. 3, 2015, which claims priority to German Patent Application No. DE 10 2014 116 207.2 filed Nov. 6, 2014, the entire contents of both of which are incorporated herein by reference.

FIELD

The present disclosure generally relates to camshafts, including module covers and methods for mounting camshaft modules.

BACKGROUND

DE 10 2004 011 586 A1 discloses a camshaft module with a module cover, two parallel camshafts being accommodated in the module cover. The camshafts comprise main shafts, and a number of displacement elements is accommodated on each main shaft. The displacement elements can have their axial position on the main shaft altered by actuators accommodated in the module cover, and therefore different cam tracks can be brought into contact with a tapping element for valve-control purposes. For example it is possible for the displacement elements to be displaced between two or three discrete axial positions, and the displacement elements are accommodated in bearing bridges which are part of the module cover. The main shaft serves merely for transmitting torque to the displacement elements, and therefore the multi-part camshaft, which is formed by the main shaft and the displacement elements, is mounted in the bearing bridges by the individual displacement elements, the main shaft being mounted in the accommodating passages of the displacement elements.

For the transmission of torque between the main shaft and the displacement elements, the main shaft comprises an external toothing arrangement, which is in engagement with an internal toothing arrangement in the accommodating passages. The displacement elements can thus be moved in an axially displaceable and rotationally fixed manner on the main shaft.

The displacement elements have cam tracks which, for operation of an internal combustion engine, have to be in a certain rotary orientation about the axis of the camshaft. The defined circumferential position of the cam tracks, in particular of the cam lobes, serves for activating the valves at the correct time, and if the camshaft comprises for example four displacement elements, then the otherwise identical displacement elements have to be arranged on the main shaft at different angular positions about the shaft axis in order to make it possible for the gas-exchange valves of the plurality of cylinders of the internal combustion engine to be activated at the correct control times.

The mounting (assembling) of the camshaft module takes place here in successive steps: first of all, the displacement elements, in particular all the displacement elements forming a camshaft, are arranged on the module cover. It has to be ensured here that the circumferential position of the displacement elements in relation to one another are already in a rotary orientation which is correct for the subsequent operation of the camshaft. The insertion of the displacement elements usually takes place manually or by a gripper which ensures the correct rotary orientation of the displacement elements. It is disadvantageous here that each individual displacement element has to be gripped differently in order for the necessary rotary orientation assigned to each displacement element to be ensured during arrangement in the module cover. Installation of the camshaft module is thus made more difficult and, in addition, is susceptible to error. A displacement element oriented incorrectly in the circumferential direction on the main shaft can result in serious damage when an internal combustion engine having such a camshaft module is subsequently started up.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure concerns a method for mounting a camshaft module comprising a module cover, in which at least one camshaft is accommodated, wherein the camshaft comprises a main shaft and an envisaged number of displacement elements with cam tracks formed thereon for valve-control purposes, and wherein the displacement elements are arranged at predetermined positions in the module cover, and wherein the main shaft is guided, along a shaft axis, through accommodating passages made in the displacement elements.

It is an object of the invention to develop a method for installing a camshaft module which allows simplified arrangement of displacement elements in the module cover before the main shaft is guided through the accommodating passages of the displacement elements. The intention is also to achieve the situation where the installation of the camshaft in the module cover, with the arrangement of the displacement elements and of the main shaft in order to form the camshaft, can be done in a way which is less susceptible to error.

According to the invention, the method comprises the following steps, which can be implemented in any order:
a) arranging at least a first displacement element in a first position in the module cover;
b) introducing the main shaft into the module cover and guiding the main shaft through the accommodating passage of the first displacement element;
c) arranging a further displacement element in a further position in the module cover;
d) rotating the main shaft about the shaft axis, with the first displacement element, by an angular amount;
e) further advancing the main shaft and guiding the main shaft through the accommodating passage of the further displacement element; and
f) repeating steps c), d) and e) until the envisaged number of displacement elements is accommodated on the main shaft, wherein the displacement elements are each arranged at the positions with an identical rotary orientation to one another about the shaft axis.

Arranging the displacement elements according to the invention with an identical rotary orientation achieves the significant advantage that the displacement elements are always arranged in an identical manner, and use can be made, for each displacement element, of a single gripper, by means of which the displacement elements are inserted in the module cover in a state in which they are oriented in a defined position. There is therefore no longer any need to ensure that the displacement elements are already inserted into the module cover in the correct rotary orientation before the main shaft is guided through. This also means that there is a significantly lower level of susceptibility to error during the installation of the camshaft module, wherein, according to a further advantage, it is possible to have improved automation capability for handling the displacement elements for installation on the module cover. Within the context of the invention, a rotary orientation is understood to mean the orientation of an angular position of the displacement elements about a shaft axis in relation to one another so that the displacement elements, for subsequent use in an internal combustion engine, can activate the valves in particular of different cylinders at fixedly predetermined control times.

According to an advantageous variant for implementing the method, it is possible for all the displacement elements to be arranged at their positions in the module cover with an identical rotary orientation about the shaft axis, and only then for the main shaft to be guided through the accommodating passages in the displacement elements, with the main shaft being rotated by the angular amount between the displacement elements. As an alternative to the above arrangement of the displacement elements on the module cover, it is also possible for the displacement elements to be arranged one after the other on the module cover. For example, a first displacement element can be arranged on the module cover, and the main shaft is introduced into the module cover and guided through the accommodating passage through the displacement element. The main shaft, with the displacement element, is then rotated by the necessary angular amount, whereafter the further displacement element is arranged on the module cover, and the main shaft is advanced further in the direction of the shaft axis until the main shaft is also guided through the accommodating passage in the second displacement element. The main shaft is then rotated again by the necessary angular amount, the first two displacement elements being rotated along correspondingly. It is thus possible for the displacement elements to be arranged on the module cover in alternation with the main shaft being guided through further and rotated by the angular amount. For example, it is possible for the camshaft to comprise four displacement elements for arranging on the module cover, in which case the main shaft is rotated by the angular amount a total of three times.

The angular amount may comprise a value which corresponds to an angular offset of the displacement elements during operation of the camshaft module arranged in an internal combustion engine. For example, the camshaft arranged in the camshaft module may be designed for the valve actuation of three, four, five or six cylinders of an internal combustion engine, and therefore the camshaft comprises three, four, five or six displacement elements. Each displacement element here is at a defined, in particular identical angular offset about the shaft axis and for example the angular amount may comprise a value of 90 degrees.

According to a particularly advantageous configuration of the method, it is possible for the main shaft, at least in part, to comprise an external longitudinal toothing arrangement, in particular for the main shaft to comprise an external longitudinal toothing arrangement which extends uniformly over the essentially entire length of the main shaft. It is also possible for an internal toothing arrangement to be provided in the accommodating passages of the displacement elements, wherein the external longitudinal toothing arrangement meshes in the internal toothing arrangement when the main shaft is guided through the accommodating passages. The tooth spacing of the external longitudinal toothing arrangement and of the internal toothing arrangement here is such that the main shaft can be rotated by the angular amount in order for teeth of the internal toothing arrangement to be able to mesh in the tooth interspaces of the external longitudinal toothing arrangement. The tooth spacing of the toothing arrangement is therefore such that it is possible to achieve the angular amount for rotating the main shaft in relation to the displacement element without the meshing of the external longitudinal toothing arrangement of the main shaft in the internal toothing arrangement of the displacement elements being adversely affected.

As an alternative, it is also possible for the displacement element to be arranged in an axially displaceable and, at the same time, rotationally fixed manner on the main shaft if the main shaft is designed in the form of a polygon shaft and a mating geometry for the polygon shaft can be formed in the accommodating passages of the displacement elements, wherein the polygon contour of the polygon shaft can likewise mesh in the mating geometry when the polygon shaft is guided through the accommodating passages.

According to a further advantageous configuration of the method, the module cover may comprise bearing bridges, wherein the displacement elements are arranged in a rotatable manner on the bearing bridges in their identical rotary orientation about the shaft axis. The camshaft can be mounted via the displacement elements arranged in the bearing bridges without there being any need for the main shaft to be mounted separately in the module cover. In particular it is possible for the displacement elements to be arranged in the bearing bridges, wherein this can take place by means of a gripper, and wherein the main shaft can be guided through the accommodating passage of the appropriate displacement element while the gripper is still gripping the displacement element. Once the main shaft has been guided through the accommodating passage of the displacement element, the gripper can be released from the displacement element, and the main shaft can be rotated with the displacement element arranged in the bearing bridge.

FIGS. 1 to 5 each show a schematic view of a camshaft module 1, in which by way of example a single camshaft 11 is arranged by way of the steps illustrated in FIGS. 1 to 5. The camshaft module 1 serves to be arranged on a cylinder head of an internal combustion engine, and the camshaft 11, shown in full in FIG. 5, serves for activating gas-exchange valves of the internal combustion engine.

Figure 1:
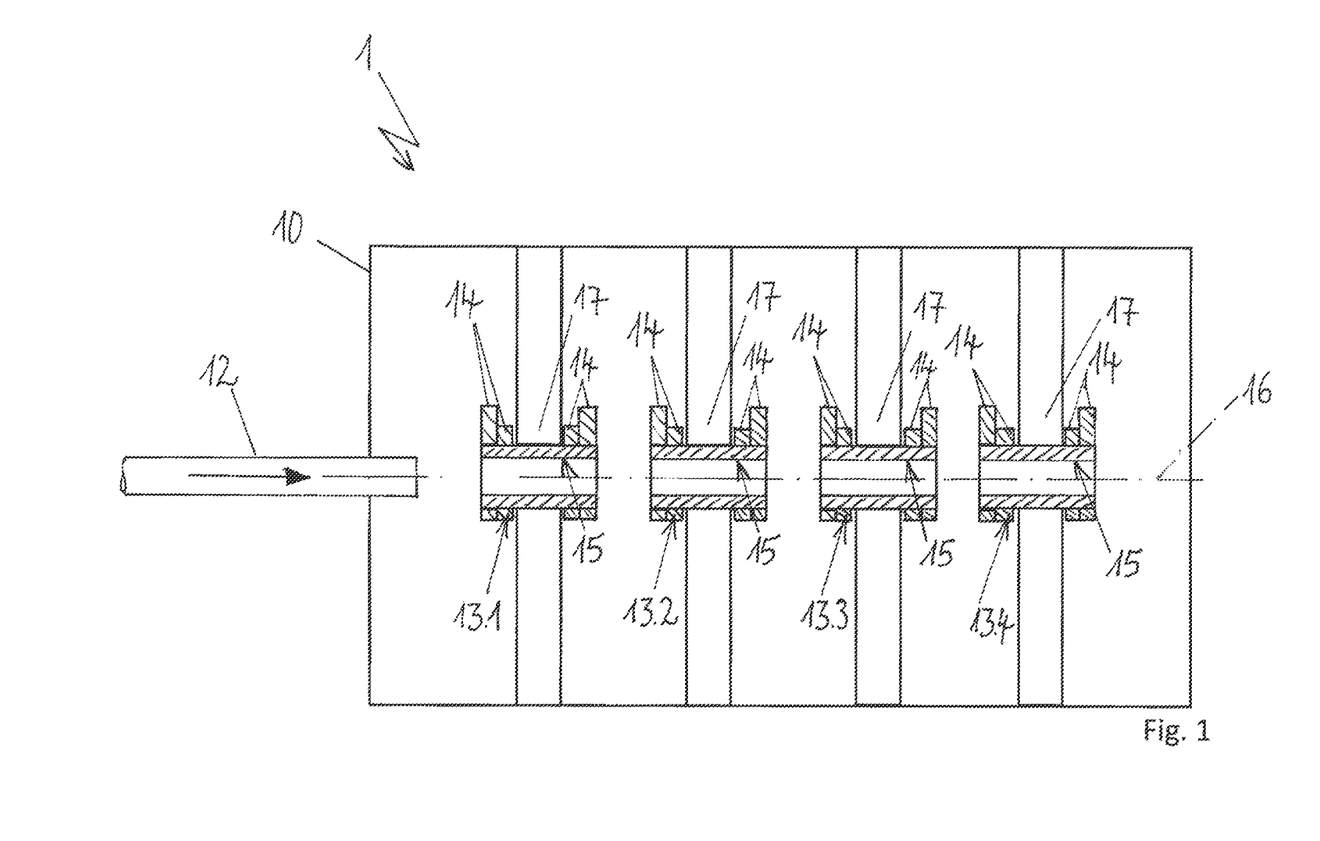
FIG. 1 is a schematic sectional view of an example camshaft module with a module cover and with four displacement elements arranged in the module cover, wherein a main shaft is being fed from an outer side of the module cover.

The camshaft module 1 comprises a frame-like module cover 10, and the module cover 10 contains bearing bridges 17, which serve for accommodating displacement elements 13.1, 13.2, 13.3 and 13.4 in a rotatable manner. The displacement elements 13.1, 13.2, 13.3 and 13.4 comprise cam tracks 14, which, as shown in FIG. 1, in order to prepare for the assembly of the camshaft 11, are all oriented in a common, identical direction. The displacement elements 13.1, 13.2, 13.3 and 13.4 can be inserted into the bearing bridges 17 by a gripper, wherein, in contrast to the illustration in FIG. 1, it is also possible for the displacement elements 13.1, 13.2, 13.3 and 13.4 to be inserted one after the other into the bearing bridges 17, in which case it would also be possible in the first instance for just the first displacement element 13.1 to be arranged in the bearing bridge 17.

The displacement elements 13.1, 13.2, 13.3 and 13.4 are shown only schematically with the cam tracks 14, and the illustration of the cam tracks 14 in the shape and number shown serves only to illustrate the rotary position of the displacement elements 13.1, 13.2, 13.3 and 13.4 about the shaft axis 16; furthermore, for the sake of simplicity, there are no control curves shown. In particular, the compact illustration of the displacement elements 13.1, 13.2, 13.3 and 13.4 with the displacement capability missing from the illustration serves merely to simplify the figures, and the shape and size of the individual components in relation to one another, in particular of the displacement elements 13.1, 13.2, 13.3 and 13.4, of the cam tracks 14 and of the bearing bridges 17, are not to scale in relation to one another.

A main shaft 12 is guided in from an outer side, as illustrated by an arrow. The main shaft 12 serves to be guided through accommodating passages 15, which are formed in the displacement elements 13.1, 13.2, 13.3 and 13.4. The individual steps of the installation method will be described hereinbelow with reference to FIGS. 1, 2, 3, 4 and 5.

Figure 2:
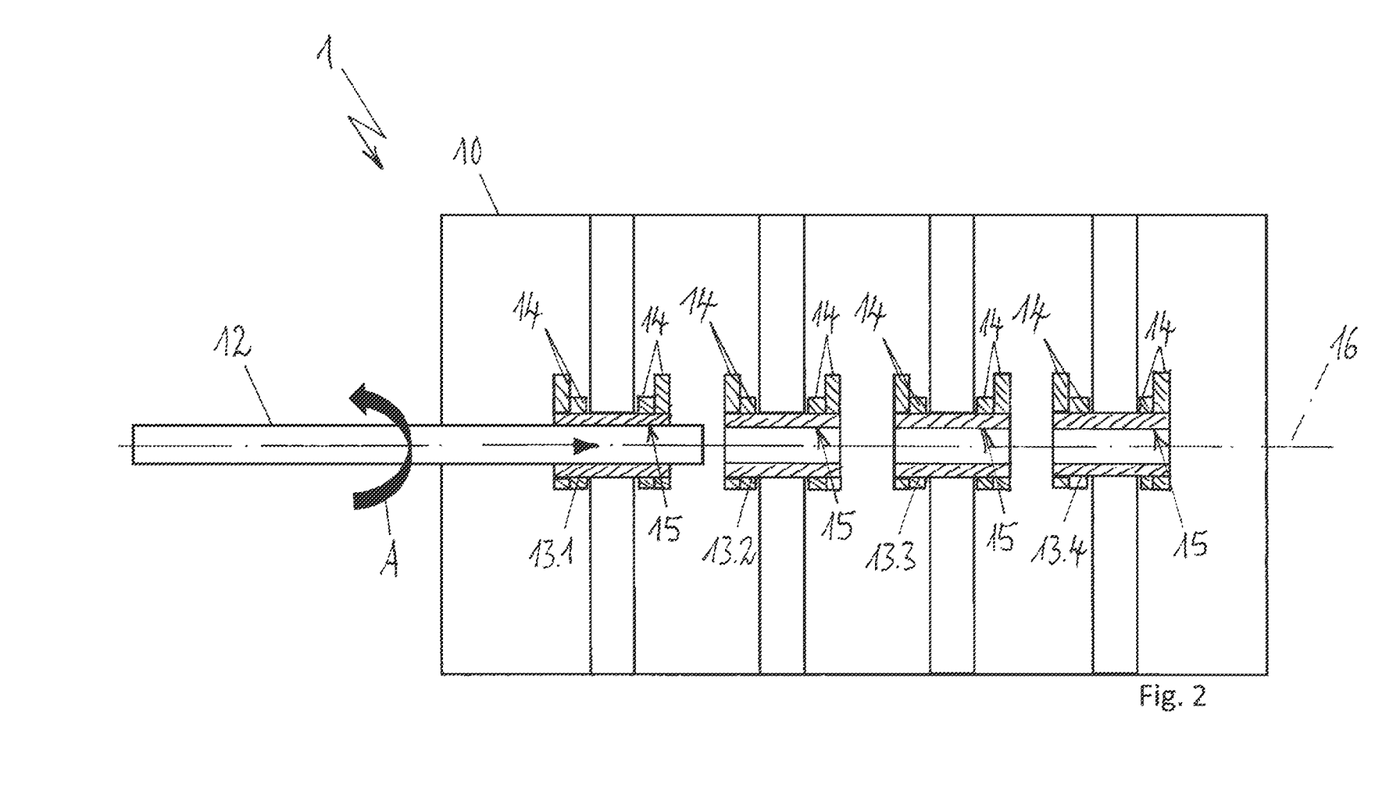
FIG. 2 is a schematic sectional view of the example camshaft module of FIG. 1 wherein the main shaft has been guided through a first displacement element.

FIG. 1 shows the main shaft 12 arranged outside the displacement elements 13.1, 13.2, 13.3 and 13.4. The exemplary embodiment shows the full arrangement of the displacement elements 13.1, 13.2, 13.3 and 13.4 in the module cover 10, and the main shaft 12 can be guided, as illustrated in FIG. 2, through the accommodating passage 15 in the first displacement element 13.1. Once the main shaft 12 has been guided through the accommodating passage 15 of the first displacement element 13.1, the main shaft 12 is rotated by an angular amount A, illustrated by a rotary arrow, for example having a value of 90 degrees.

Figure 3:
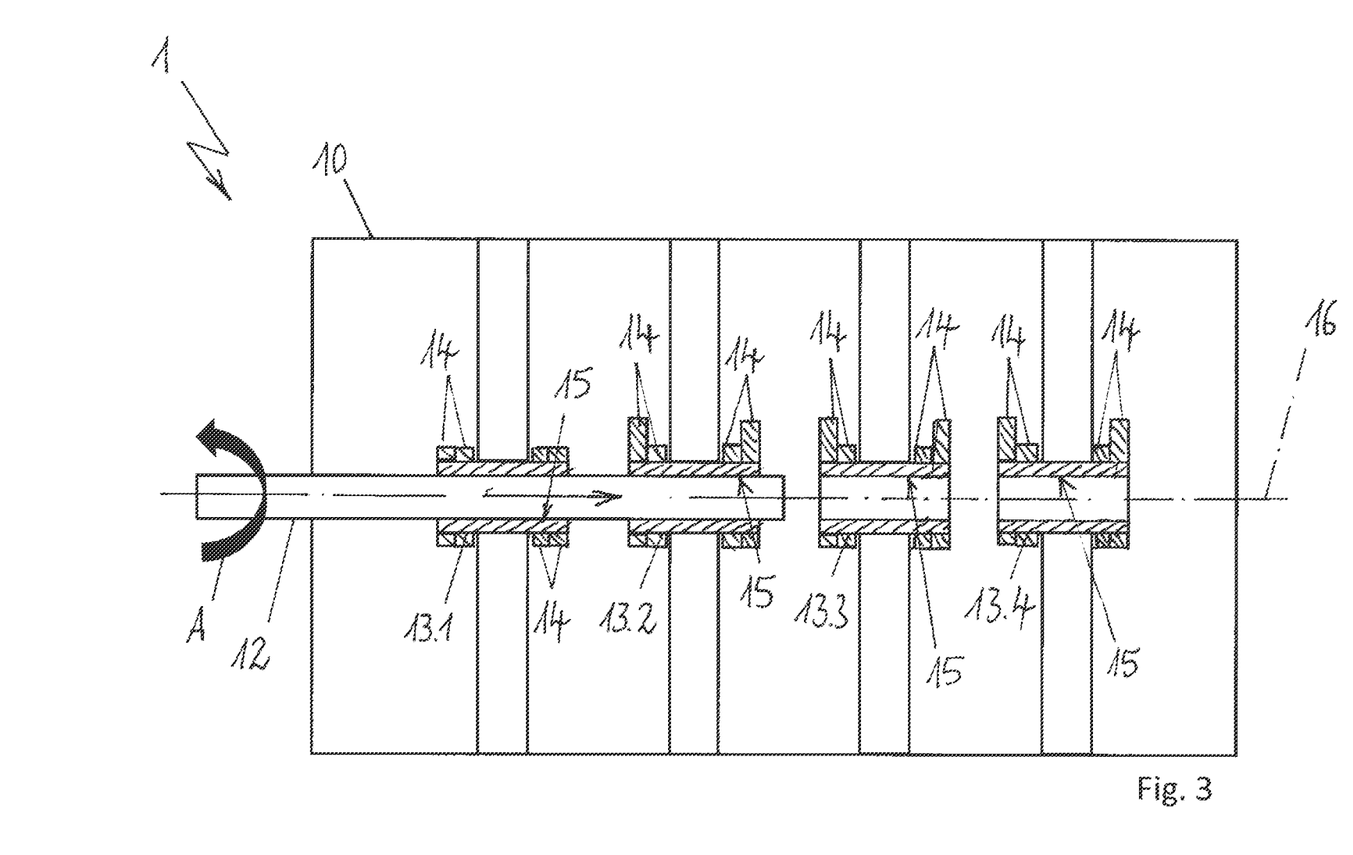
FIG. 3 is a schematic sectional view of the example camshaft module of FIG. 2 wherein the main shaft has been guided through another displacement element.

There is no illustration given of an internal toothing arrangement in the accommodating passages 15 of the displacement elements 13.1, 13.2, 13.3 and 13.4, and the main shaft 12 is designed with an external longitudinal toothing arrangement so that, once the main shaft 12 has been guided through the accommodating passages 15, the displacement elements 13.1, 13.2, 13.3 and 13.4 are arranged in a rotationally fixed and axially displaceable manner on the main shaft 12. Consequently, the first displacement element 13.1 rotates by the identical angular amount A about the shaft axis 16, and the transition between the illustration in FIG. 2 and the illustration in FIG. 3 shows that the main shaft 12, with the displacement element 13.1, has been rotated by 90 degrees before the main shaft 12 has been advanced further into the accommodating passage 15 of the second displacement element 13.2. Then, as the transition between FIG. 3 and FIG. 4 shows, the main shaft 12, with the displacement elements 13.1 and 13.2, is rotated again by the angular amount A, for example 90 degrees, about the shaft axis 16, and therefore the cam tracks 14 have each been rotated through 90 degrees in relation to the preceding figure, and for example the cam track of the displacement element 13.1 in FIG. 3 has been rotated out of the section plane, and by way of a further rotation by the angular amount A with a value of 90 degrees FIG. 4 shows the cam track 14 of the displacement element 13.1 in a 180-degree position in relation to the position of the cam track 14 of the displacement element 13.1 in FIG. 2.

Figure 4:
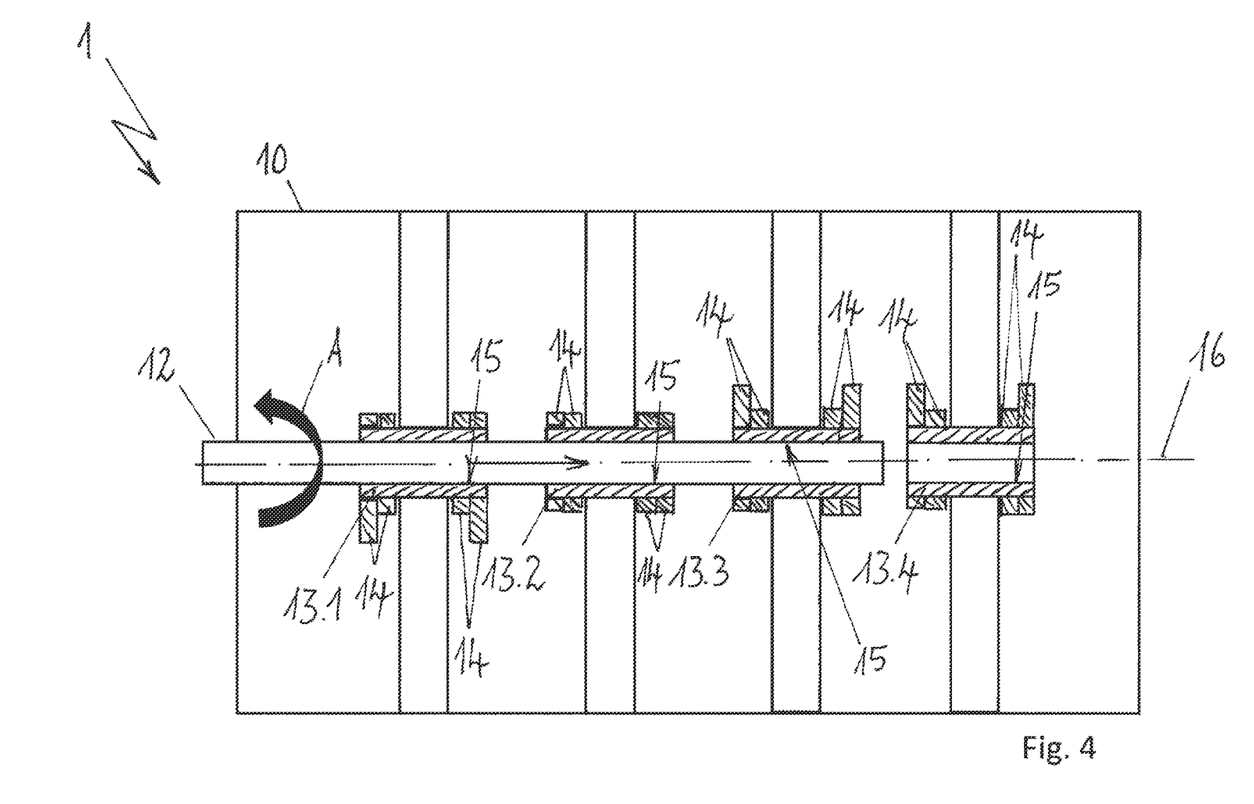
FIG. 4 is a schematic sectional view of the camshaft module of FIG. 3 wherein the main shaft has been guided through still another displacement element.
Figure 5:
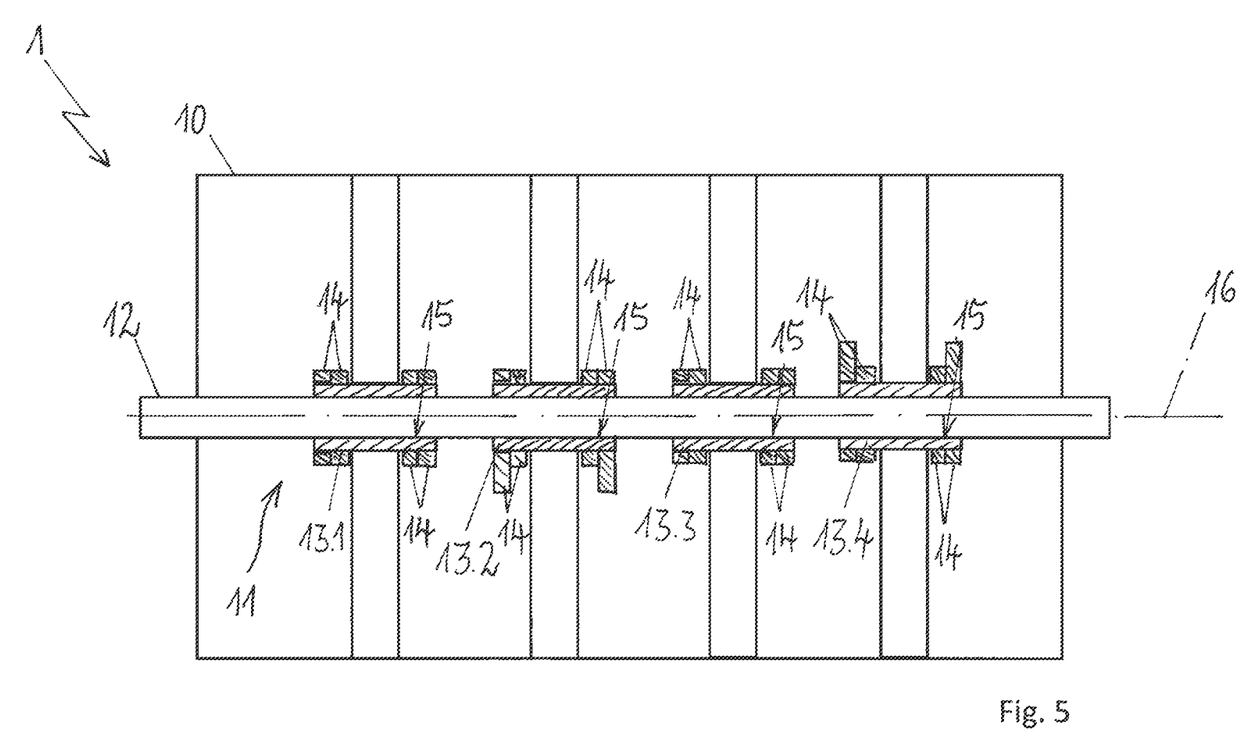
FIG. 5 is a schematic sectional view of an example camshaft module with a main shaft that has been guided through four displacement elements, which results in a finished camshaft in the module cover.

FIG. 4 transitioning into FIG. 5 shows the further advancement of the main shaft 12, through the accommodating passages 15, into the further displacement elements 13.3 and 13.4. Once the main shaft 12 has been guided through the accommodating passage 15 in the displacement element 13.4, there is no further rotation of the main shaft 12 by an angular amount A since, as illustrated on the cam tracks 14 of the displacement elements 13.1, 13.2, 13.3 and 13.4 in FIG. 5, the rotary orientations of the cam tracks 14 have been offset in each case by 90 degrees, as is required for the subsequent operation of the internal combustion engine. The camshaft module 1 with the camshaft 11 formed in this way can then be brought into operation, and the displacement elements 13.1, 13.2, 13.3 and 13.4 are in the rotary orientation in relation to one another which is necessary in each case for the subsequent valve operation of the internal combustion engine.

The invention is not restricted to the preferred exemplary embodiment given above. Rather, a number of variants which make use of the solution illustrated, even in the case of fundamentally different types of design, are conceivable. All the features and/or advantages which can be gathered from the claims, from the description or from the drawings, including design details or spatial arrangements, may be essential to the invention both in their own right and in a wide variety of different combinations. In particular, there is no need for the full number of displacement elements 13.1, 13.2, 13.3 and 13.4 shown to be already arranged in the respective bearing bridges 17; it is also possible for them to be arranged one after the other once the main shaft 12 has been guided through the respective displacement element and once the main shaft 12 has been rotated by the angular amount A.

LIST OF REFERENCE SIGNS

1 Camshaft module
10 Module cover
11 Camshaft
12 Main shaft
13.1 Displacement element
13.2 Displacement element
13.3 Displacement element
13.4 Displacement element
14 Cam track
15 Accommodating passage
16 Shaft axis
17 Bearing bridge

What is claimed is:
1. A method for mounting a camshaft module comprising a module cover in which a camshaft is configured to be received, the camshaft comprising a main shaft and a plurality of displacement elements with cam tracks formed thereon for valve-control purposes, wherein the plurality of displacement elements are disposed at predetermined positions in the module cover, wherein the main shaft is guided along a shaft axis through accommodating passages of the plurality of displacement elements, wherein the method comprises:
 providing the module cover;
 positioning a first of the plurality of displacement elements in a first position in the module cover;
 introducing the main shaft into the module cover and guiding the main shaft through the accommodating passage of the first of the plurality of displacement elements;
 positioning a second of the plurality of displacement elements in a second position in the module cover such that rotary orientations of the first and second of the plurality of displacement elements about the shaft axis as positioned in the module cover are the same;
 rotating the main shaft about the shaft axis by an angular amount; and
 advancing the main shaft and guiding the main shaft through the accommodating passage of the second of the plurality of displacement elements,
 wherein the module cover includes an operational camshaft assembled therein when the main shaft has been fully advanced into the module cover and the plurality of displacement elements have all been secured on the main shaft.

2. The method of claim 1 further comprising repeating the positioning, rotating, and advancing steps until all of the plurality of displacement elements are accommodated on the main shaft, wherein each of the plurality of displacement elements is positioned in the module cover at an identical rotary orientation about the shaft axis.

3. The method of claim 2 wherein the main shaft is rotated about the shaft axis with the first of the plurality of displacement elements.

4. The method of claim 1 wherein the main shaft is rotated about the shaft axis with the first of the plurality of displacement elements.

5. The method of claim 1 wherein a gripper is used to position the plurality of displacement elements in the module cover at an identical rotary orientation about the shaft axis.

6. The method of claim 1 wherein all of the plurality of displacement elements to be mounted on the main shaft are positioned in the module cover before introducing and guiding the main shaft through the accommodating passages of the plurality of displacement elements, wherein the main shaft is rotated between each successive displacement element.

7. The method of claim 1 wherein the angular amount corresponds to an angular offset between the first and second of the plurality of displacement elements during operation of the camshaft module in an internal combustion engine.

8. The method of claim 1 wherein the angular amount is 90°.

9. The method of claim 1 wherein guiding the main shaft through the accommodating passages and rotating the main shaft comprises meshing an external longitudinal toothing arrangement of the main shaft with internal toothing arrangements of the accommodating passages of the plurality of displacement elements.

10. The method of claim 1 wherein the module cover comprises bearing bridges, wherein the plurality of displacement elements are positioned in a rotatable manner on the bearing bridges in the same rotary orientation about the shaft axis.

11. A method for mounting a camshaft module comprising a module cover configured to receive a camshaft along a shaft axis, the camshaft comprising a main shaft and a plurality of displacement elements with cam tracks formed thereon, the method comprising:
 providing the module cover;
 positioning the plurality of displacement elements in the module cover at a rotary orientation that is the same for each of the plurality of displacement elements; and
 guiding and advancing the main shaft through accommodating passages of the plurality of displacement elements, wherein as the main shaft is guided into successive displacement elements the main shaft is rotated about the shaft axis by an angular amount,
 wherein the module cover includes an operational camshaft assembled therein when the main shaft is fully advanced into the module cover and the plurality of displacement elements have all been secured on the main shaft.

12. The method of claim 11 wherein the main shaft is rotated about the shaft axis with one of the plurality of displacement elements.

13. The method of claim 11 wherein the main shaft is rotated about the shaft axis with a first of the plurality of displacement elements through which the main shaft is guided.

14. The method of claim 11 wherein a gripper is used to position the plurality of displacement elements in the module cover at the same rotary orientation about the shaft axis.

15. The method of claim 11 wherein all of the plurality of displacement elements to be mounted on the main shaft are positioned in the module cover before guiding the main shaft through any of the accommodating passages of the plurality of displacement elements.

16. The method of claim 11 wherein only some of the plurality of displacement elements to be mounted on the main shaft are positioned in the module cover before guiding the main shaft through any of the accommodating passages of the plurality of displacement elements.

17. The method of claim 11 wherein the angular amounts correspond to angular offsets between the plurality of displacement elements during operation of the camshaft module in an internal combustion engine.

18. The method of claim 11 wherein at least one of the angular amounts is 90°.

19. The method of claim 11 wherein guiding the main shaft through the accommodating passages and rotating the main shaft comprises meshing an external longitudinal toothing arrangement of the main shaft with internal toothing arrangements of the accommodating passages of the plurality of displacement elements.

20. The method of claim 11 wherein the module cover comprises bearing bridges, wherein the plurality of displacement elements are positioned in a rotatable manner on the bearing bridges in the same rotary orientation about the shaft axis.

* * * * *